(12) United States Patent
Detweiler et al.

(10) Patent No.: US 7,373,362 B2
(45) Date of Patent: May 13, 2008

(54) COORDINATED SYNCHRONIZATION

(75) Inventors: Richard Detweiler, Boise, ID (US); David Butler, Boise, ID (US); Srinivasan Ramanujam, Boise, ID (US); Scott A. Jeide, Meridian, ID (US)

(73) Assignee: Extended Systems, Inc., Boise, ID (US)

( * ) Notice: Subject to any disclaimer, the term of this patent is extended or adjusted under 35 U.S.C. 154(b) by 241 days.

(21) Appl. No.: 10/075,134

(22) Filed: Nov. 19, 2001

(65) Prior Publication Data

US 2003/0097381 A1 May 22, 2003

(51) Int. Cl.
*G06F 17/30* (2006.01)

(52) U.S. Cl. ........................ 707/201; 707/203

(58) Field of Classification Search ............. 707/8, 707/201, 10, 203; 709/213–216
See application file for complete search history.

(56) References Cited

U.S. PATENT DOCUMENTS

| | | | |
|---|---|---|---|
| 5,519,606 A | 5/1996 | Frid-Nielsen et al. | |
| 5,778,346 A | 7/1998 | Frid-Nielsen et al. | |
| 5,884,325 A * | 3/1999 | Bauer et al. | 707/201 |
| 5,926,816 A * | 7/1999 | Bauer et al. | 707/8 |
| 5,978,805 A * | 11/1999 | Carson | 707/10 |
| 5,978,813 A * | 11/1999 | Foltz et al. | 707/201 |
| 5,991,771 A * | 11/1999 | Falls et al. | 707/202 |
| 6,202,085 B1 * | 3/2001 | Benson et al. | 709/205 |
| 6,216,131 B1 | 4/2001 | Liu et al. | |
| 6,275,831 B1 | 8/2001 | Bodnar et al. | |
| 6,295,541 B1 | 9/2001 | Bodnar et al. | |
| 6,308,201 B1 * | 10/2001 | Pivowar et al. | 709/214 |
| 6,317,754 B1 * | 11/2001 | Peng | 707/203 |
| 6,345,308 B1 * | 2/2002 | Abe | 709/248 |
| 6,401,104 B1 | 6/2002 | LaRue et al. | |
| 6,412,017 B1 * | 6/2002 | Straube et al. | 719/313 |
| 6,449,622 B1 | 9/2002 | LaRue et al. | |
| 6,460,051 B1 | 10/2002 | LaRue et al. | |
| 6,477,545 B1 | 11/2002 | LaRue | |
| 6,487,560 B1 | 11/2002 | LaRue et al. | |
| 6,496,835 B2 | 12/2002 | Liu et al. | |
| 6,535,892 B1 | 3/2003 | LaRue et al. | |
| 6,581,075 B1 * | 6/2003 | Guturu et al. | 707/201 |
| 6,625,621 B2 | 9/2003 | Tan et al. | |
| 6,671,703 B2 | 12/2003 | Thompson et al. | |
| 2002/0038314 A1 | 3/2002 | Thompson et al. | |
| 2002/0059299 A1 * | 5/2002 | Spaey | 707/104.1 |
| 2002/0133508 A1 | 9/2002 | LaRue et al. | |

(Continued)

*Primary Examiner*—Kim Vu
*Assistant Examiner*—Tom Gyorfi
(74) *Attorney, Agent, or Firm*—Ormiston & McKinney, PLLC

(57) ABSTRACT

A coordinating push and user-initiated synchronization method and system. Initially, changes to a local application data store are detected and records affected by the change are identified. At some point, a record affected by a detected change is pushed to a remote system where it is ascertained whether the pushed record, in its current form as affected by the detected change, has already been replicated in or deleted from a remote application data store through user-initiated synchronization. If not, the pushed record is used to update the remote application data store. Instead, at some point it may be ascertained whether the identified record, in its current form as affected by the detected change, has been replicated in or deleted from the remote application data store through push synchronization as just described. If not, the remote application data store is synchronized with the local application data store.

20 Claims, 15 Drawing Sheets

U.S. PATENT DOCUMENTS

2002/0156798 A1    10/2002  LaRue et al.
2002/0174180 A1*   11/2002  Brown et al. ............... 709/203
2002/0194207 A1    12/2002  Bartlett et al.
2005/0055382 A1*   3/2005   Ferrat et al. ................ 707/201

* cited by examiner

COORDINATED SYNCHRONIZATION

FIELD OF THE INVENTION

This invention relates generally to synchronizing electronic data. More specifically, this invention is directed to coordinating user-initiated synchronization and push synchronization.

BACKGROUND OF THE INVENTION

In today's computer networks, sharing data among devices has become desirable if not essential. Not only does the shared data need to be replicated on each device, but the set of replicated data must be synchronized so that changes made to one replica are reflected in all the others. Synchronization enables many users to work with their own local copy of shared data but have the shared data updated as if they were working on a single, centralized database. For shared data applications where users are geographically widely distributed, replication and synchronization are often the most efficient methods for effectively utilizing shared data.

In addition to desktop computers, workstations, and servers, modern computing environments often include lightweight handheld computing devices that fit into a pocket, purse, or day planner. Modern computing environments range from private networks to the Internet. Although a wide range of application programs can be executed on handheld computers, shared data applications are particularly popular and well suited for these devices. Shared data applications include, among many others, electronic calendars and task lists, electronic mail organizers, and electronic address books. A device running one or more of these applications stores electronic data that is or can be replicated and shared with other devices. It is desirable, if not essential, then to at least periodically synchronize data stored on each device. For example, many calendaring applications allow devices to share data or records concerning each user's appointments. It is important that when a new appointment is added or an existing appointment is modified on one device that the addition or change is reflected on all devices providing calendaring.

Synchronization schemes typically fall under one of two generic categories—"user-initiated" synchronization and "push" synchronization. User-initiated synchronization is commonly employed in "wired" computer networks where computing devices such as server, desktop computers, laptop computers, and personal digital assistants (PDA's) are at least periodically physically interconnected. As its label suggests, this scheme requires a user to commence the synchronization process by, for example, initiating synchronization software. The software analyzes and compares electronic records found on two or more devices and updates each device with new or modified records found on the other devices.

Push synchronization is commonly employed in "wireless" computer networks where the computing devices are able to transmit and receive electronic data via radio frequency, infrared, or any other technology not requiring a physical connection such as a cable between the devices. Typically, for wireless networks, connection speeds between devices are relatively slow and less reliable in comparison to wired networks. This scheme requires no user intervention. Synchronization software monitoring electronic records on one device, typically a server, detects modifications or additions to the records on that device. Upon detection, the synchronization software takes the modified or added records and updates the records located on a remote device such as a pager, cellular telephone, or other wireless device. Push synchronization requires minimal communication between devices, and as a consequence, works well for slower and less reliable networks such as wireless networks.

Where a given computing environment employs one of the above schemes, synchronization is a relatively simple process. However, in modern computing environments, wired and wireless network technologies are often combined making it desirable to simultaneously employ both synchronization schemes. Unfortunately, combining a conventional user-initiated synchronization scheme with a conventional push synchronization scheme inevitably results in unwanted data duplication and/or data loss. Employing wireless networks increases the risk of "trapped" data. Because of the relatively slow connections, sudden unplanned network downtime, and the possibility of the remote device being disconnected from the wireless network connection at any time, it is possible that a pushed record can become "trapped." While the pushed record is trapped, the device could be synchronized conventionally with the server over a wired connection. When wireless connection is later reestablished the pushed and trapped record is then duplicated.

SUMMARY OF THE INVENTION

The present invention is directed to coordinating push and user-initiated synchronization schemes. Initially, changes to a local application data store are detected and records affected by the change are identified. At some point, a record affected by a detected change is pushed to a remote system where it is ascertained whether the pushed record, in its current form as affected by the detected change, has already been replicated in or deleted from a remote application data store through user-initiated synchronization. If not, the pushed record is used to update the remote application data store. Instead, at some point it may be ascertained whether the identified record, in its current form as affected by the detected change, has been replicated in or deleted from the remote application data store through push synchronization as just described. If not, the remote application data store is synchronized with the local application data store.

DETAILED DESCRIPTION OF THE INVENTION

INTRODUCTION: In today's mobile computing environment electronic records are replicated and shared across many devices. As new records are added or existing records altered or deleted on one device, it is essential to accurately synchronize those records on the other devices. Differing synchronization schemes provide benefits depending upon how the devices are connected. Push synchronization works well for wireless devices, those being devices that are interconnected using radio frequency, infra-red, or any other technology not requiring a physical interconnection. User-initiated synchronization works well for wired devices, that is, those devices that are at least periodically interconnected through cables whether those cables be fiber optic, phone lines, or conventional networking lines.

As mobile computing environments incorporate both wired and wireless devices, it becomes desirable, if not essential, to utilize both user-initiated and push synchronization schemes. It is expected that varying embodiments of the present invention will enable the concurrent use of both schemes without unwanted record duplication or loss. In the description that follows, user-initiated synchronization and push synchronization will be discussed separately with reference to FIGS. 1-4 and 5-8 respectively. Following, a coordinated scheme incorporating both user-initiated and push synchronization will be described with reference to FIGS. 9-15.

Figure 1:
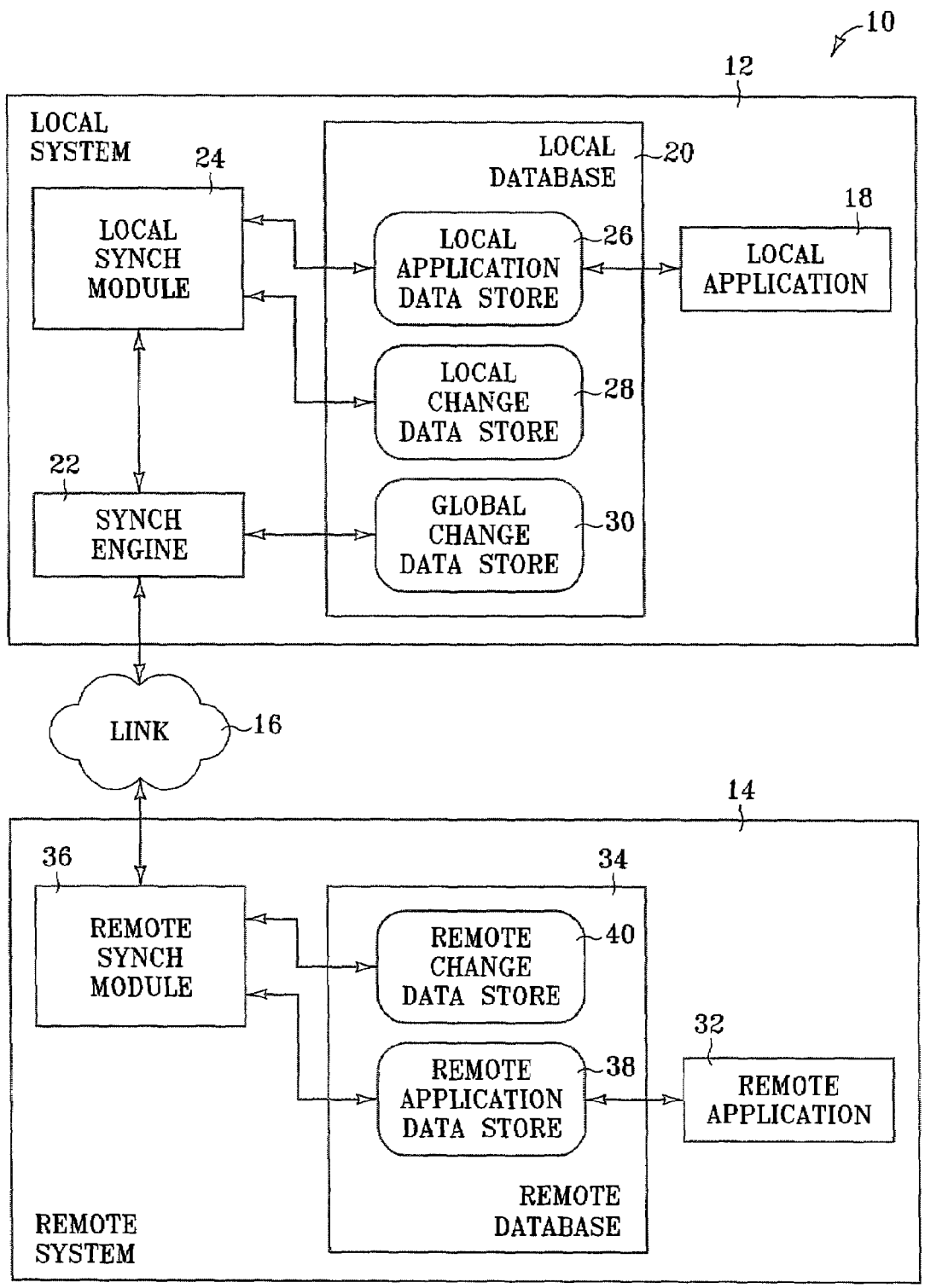
FIG. 1 is a schematic representation of a computing environment employing a user-initiated synchronization scheme.

USER-INITIATED SYNCHRONIZATION: FIG. 1 illustrates a computing environment 10 that employs a user-initiated synchronization scheme. Environment 10 includes local system 12 and remote system 14 interconnected by link 16. Systems 12 and 14 can be personal computers, servers, PDA's (Personal Digital Assistants), or any other computing devices or combination of computing devices and peripherals capable of utilizing and sharing electronic records. Link 16 represents generally a cable, wireless, or remote connection via a telecommunication link, an infrared link, a radio frequency link, or any other connector or system that provides electronic communication between the devices. Link 16 may represent, in part, an intranet, the Internet, or a combination of both.

Local system 12 includes local application 18, local database 20, synch engine 22, and local synch module 24. Local application 18 represents generally any programming capable of utilizing and sharing electronic records. Local application 18 may be or include, among many others, a calendaring program, an electronic mail organizer, a task scheduler, an electronic address book, or any combination of the above. Local database 20 represents generally any source of memory capable of storing electronic records and other data accessible by local application 18, synch engine 22, and local synch module 24. The electronic records may represent, among many other items, appointments, tasks, electronic mail, addresses, and/or other shared electronic documents or files. Synch engine 22 represents any programming capable of synchronizing electronic records stored on local system 12 with electronic records stored on remote system 14. Local synch module 24 represents any programming capable of, at the request of synch engine 22, retrieving records from local database 20, updating records in local database 20 in the format required by local application 18, and tracking changes made by local application 18 in local database 20.

Local database 20 includes local application data store 26, local change data store 28, and global change data store 30. Local application data store 26 represents a logical memory area containing the records used by local application 26. Again, these records may represent appointments, tasks, electronic mail, addresses, and/or other shared electronic documents or files. Local change data store 28 represents a logical memory area containing electronic data representing changes in local application data store 26 detected by local synch module 24. Global change data store 30 represents a logical memory area containing electronic data representing changes in local application data store 26 detected by synch engine 22.

Remote system 14 includes remote application 32, remote database 34, and remote synch module 36. Remote application 32 represents generally any programming capable of utilizing and sharing records. Remote database 34 represents generally any source of memory capable of storing records and other electronic data accessible by remote application 32 and remote synch module 36. Remote synch module 36 represents any programming capable of, at the request of synch engine 22, retrieving records from remote database 34, updating records in remote database 34 in the format required by remote application 32, and tracking changes made by remote application 32 in remote database 34. Remote database 34 includes remote application data store 38 and remote change data store 40. Remote application data store 38 represents a logical memory area containing the records used by remote application 32. Except for recent modifications, additions, and/or deletions, these records are replicas of the records stored in local application data store 26. Remote change data store 40 represents a logical memory area containing electronic data representing changes in remote application data store 38 detected by remote synch module 36.

Figure 2:
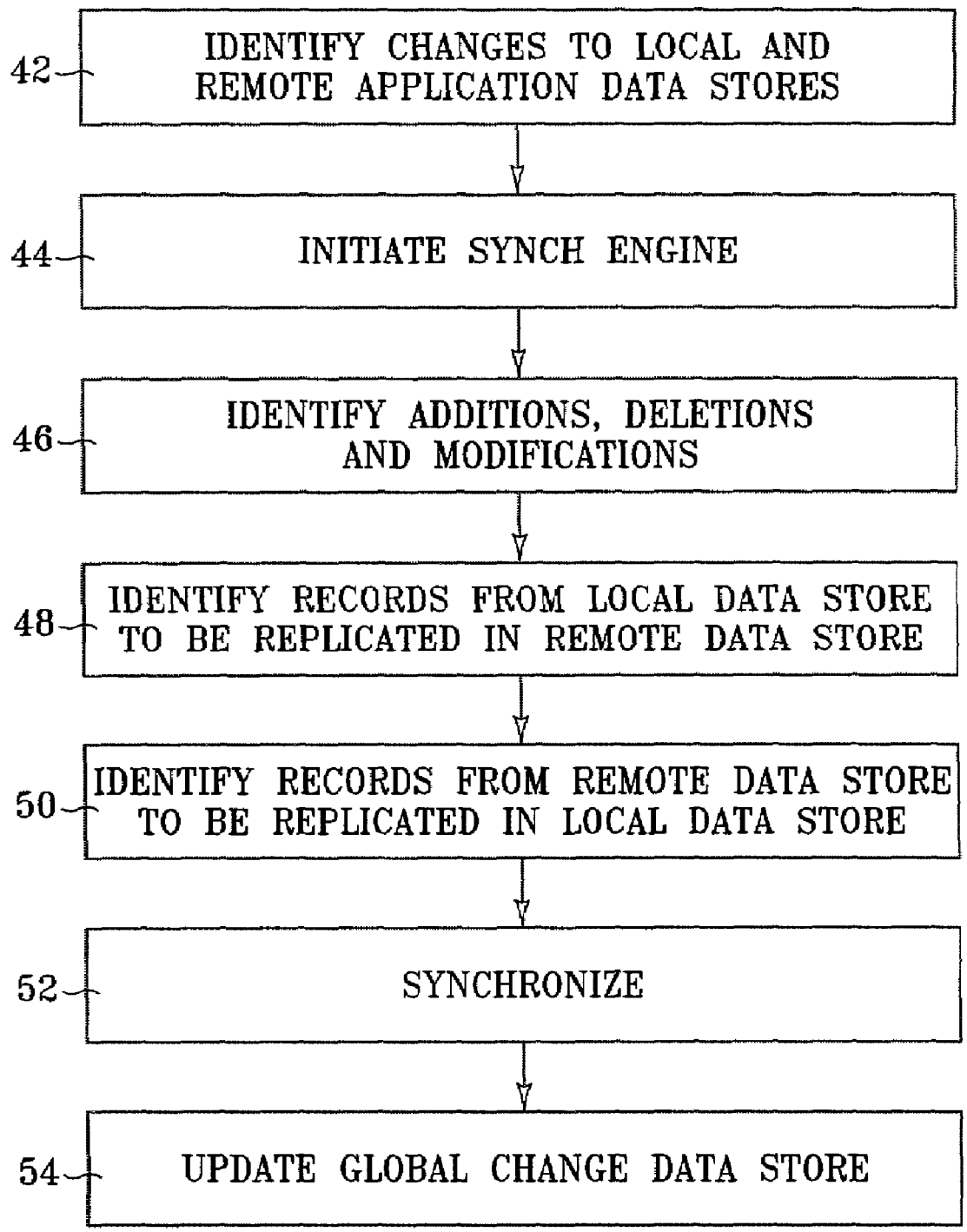
FIG. 2 is a flow diagram illustrating the user-initiated synchronization process with respect to FIG. 1.

FIG. 2 is a flow diagram illustrating the user-initiated synchronization process utilizing mobile computing environment 10 of FIG. 1. Local and remote sync modules 24 and 36 monitor and identify changes made to local and remote application data stores 26 and 38 (step 42). To do so, local and remote synch modules 24 and 26 associate each record, upon creation, in local or remote application data stores 26 or 38 with a change counter stored in local change data store 28 or remote change data store 40. Each change counter reflects changes made to a given record. For each change, the value of a given record's change counter is increased. For example, as a record is created in local application data store 26 by local application 18, application specific synch module 26 associates a change counter with the new record setting the counter's value to one. When local application 18 later modifies or deletes the same record, local synch module 26 detects the change and increases the change counter's value to two. Local synch module 26 increases the counter's value for each subsequent change.

A user then initiates synch engine 22 (step 44). Synch engine 22 identifies additions, deletions, and modifications to local and remote application data stores 26 and 38 (step 46). Synch engine 22 examines local and remote synch modules 24 and 36 for changes made to records in local and remote application data stores 26 and 38, obtaining the change counter associated with each record. Global change data store 30 also contains change counters, each counter associated with a record. The value of each of the change counters in global change data store 30 reflects the number of changes detected for a given record by synch engine 22 following the most recent synchronization. To determine if a particular record has been changed, synch engine 22 compares the record's change counter found in global change data store 30 with the record's change counter found in local and remote change data stores 24 and 36.

If the values of the change counters are equal, then no modifications have been made to the record since the last synchronization. If, for a particular record, the value of the change counter in either local or remote change data stores 24 or 36 exceeds the value of the record's change counter found in global change data store 30, then the record has been modified since the last synchronization. If global change data store 30 does not contain a change counter for a record found in local or remote application data store 26 or 38, then that record is new. If global change data store 30 contains a change counter for a record not found in local or remote application data stores 26 and/or 38, then that record has been deleted from one or both data stores 26 and/or 30.

Synch engine 22 next determines which records from local application data store 26 are to be replicated in remote application data store 38 (step 48) and which records from remote application data store 38 are to be replicated in local application data store 26 (step 50). With the data acquired and analyzed in the previous steps, synch engine 22 synchronizes local application data store 26 with remote application data store 38 (step 52). The following describes the logic followed by synch engine in step 52:

Where synch engine 22 determines that a record is new to local application data store 26—Using local synch module 24, synch engine 22 retrieves that record form local application data store 26 and instructs remote synch module 36 to replicate that record in remote application data store 38 in a format required by remote application 32. Remote synch module 36 then creates a change counter for that record in remote change data store 40 with a value to match the change counter for the same record in local change data store 28.

Where synch engine 22 determines that a record is new to remote application data store 38—Using remote synch module 36, synch engine 22 retrieves that record from remote application data store 38 and instructs local synch module 24 to replicate that record in local application data store 26 in a format required by local application 18. Local synch module 24 then creates a change counter for that record in local change data store 28 with a value to match the change counter for the same record in remote change data store 40.

Where synch engine 22 determines that a record in local application data store 26 has been modified—Using local synch module 24, synch engine 22 retrieves that record from local application data store 26 and instructs remote synch module 36 to replicate that record in remote application data store 38 in a format required by remote application 32 replacing the prior version of that record. Remote synch module 36 alters the value of the change counter for that record in remote change data store 40 to match the value of the change counter for the same record in local change data store 28.

Where synch engine 22 determines that a record in remote application data store 38 has been modified—Using remote synch module 36, synch engine 22 retrieves that record from remote application data store 38 and instructs local synch module 24 to replicate that record in local application data store 26 in a format required by local application 18 replacing the prior version of that record. Local synch module 24 alters the value of the change counter for that record in local change data store 28 to match the value of the change counter for the same record in remote change data store 40.

Where synch engine 22 determines that a record in local application data store 26 has been deleted—Using remote synch module 36, synch engine 22 deletes the record in remote application data store 38 that corresponds to the record previously deleted in local application data store 26. Local and remote synch modules 24 and 36 remove change counters—associated with the deleted record—from local and remote change data stores 28 and 40.

Where synch engine 22 determines that a record in remote application data store 38 has been deleted—Using local synch module 24, synch engine 22 deletes the record in local application data store 26 that corresponds to the record previously deleted in remote application data store 38. Local and remote synch modules 24 and 36 remove change counters—associated with the deleted record—from local and remote change data stores 28 and 40.

Once synchronization completes in step 52, synch engine 22 updates global change data store 30 to reflect the change counters found in local and remote change stores 28 and 40 (step 54). Global, local, and remote change data stores 30, 28 and 40 should now contain identical change counters for each record indicating to synch engine 22 that local and global application data stores 26 and 38 are synchronized.

Figure 3:
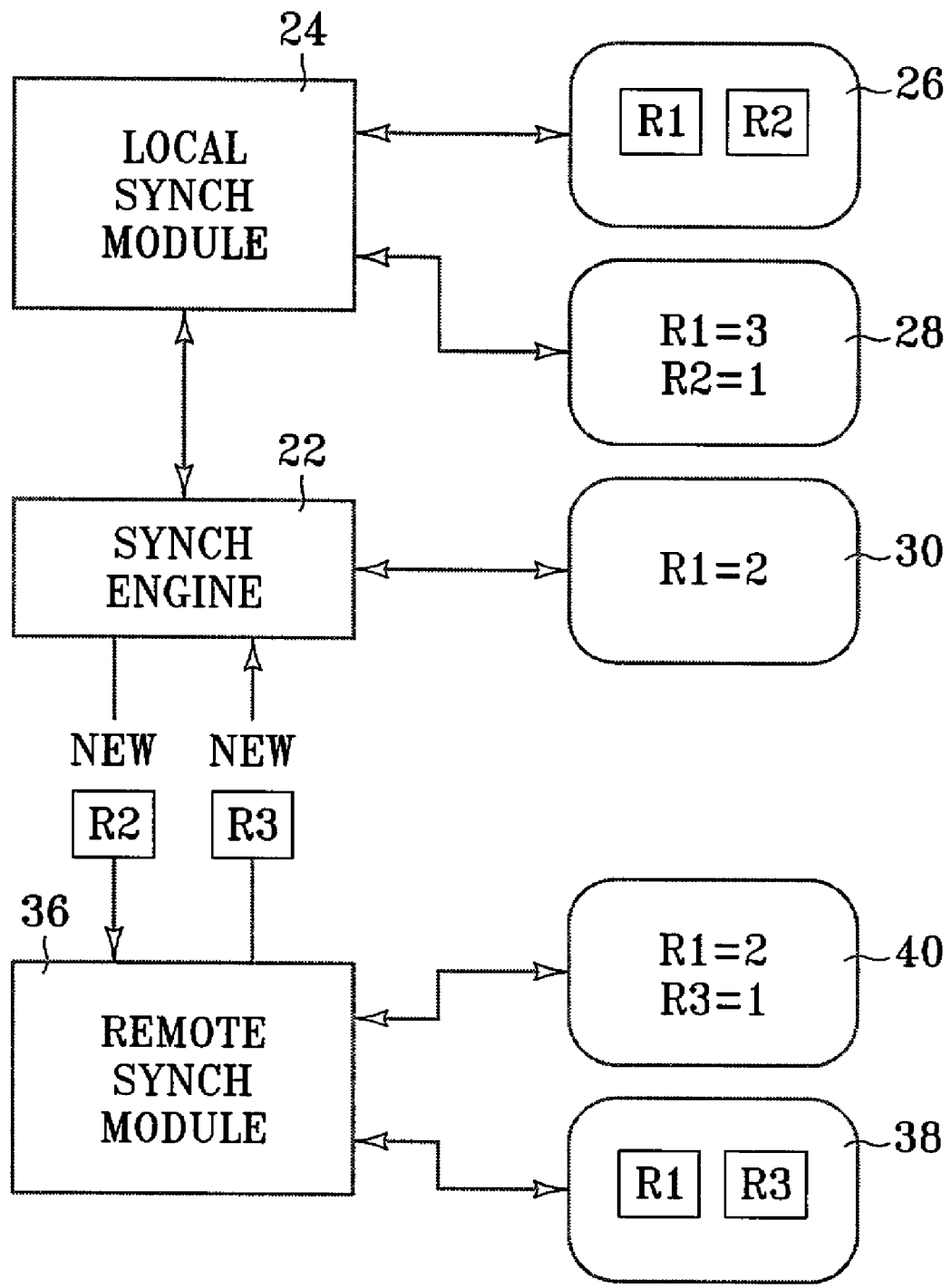
FIGS. 3 and 4 are simplified schematic diagrams of the environment of FIG. 1 providing an example of user-initiated synchronization.

Referring now to FIG. 3 as an example, local application data store 26 includes two records R1 and R2. Local change data store 28 indicates that R1 has a change counter of three—the record has been created and then modified twice. R2 has a change counter of one—it has not been altered since created. Remote application data store 38 includes two records R1 and R3. Remote change data store 40 indicates that R1 has a change counter of two and R3 has a change counter of one. In other words, R1 has been modified once since created, and R3 has not been modified. Global change data store 30 contains a change counter only for R1 which indicates that R1 had a change counter of two following the previous synchronization.

Figure 4:
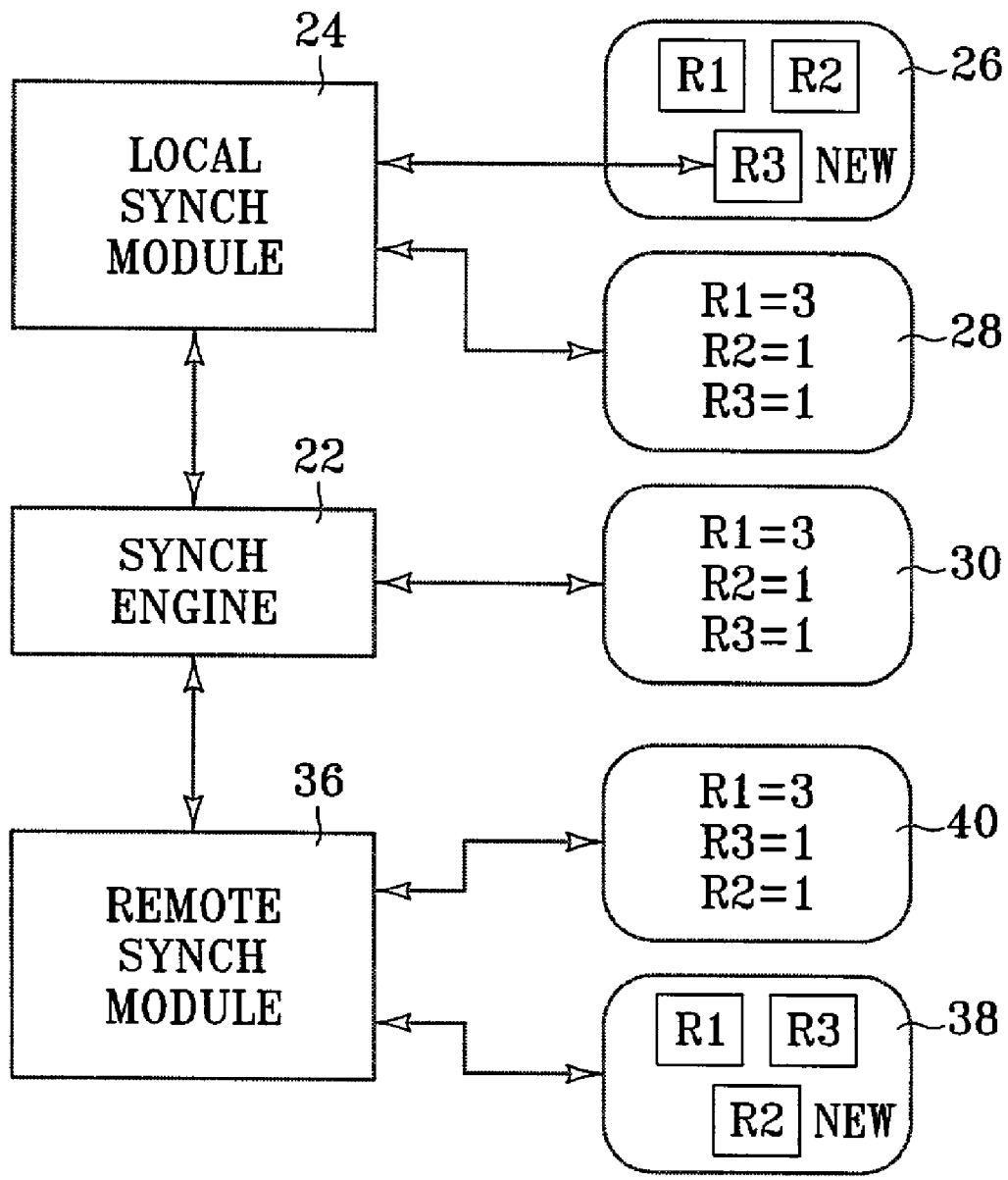

Comparing the change counters in global change data store 30 with those found in local and remote change data stores 28 and 40 indicates that records R2 and R3 are new—created after the last synchronization—and that R1 has been modified in local application data store 26 but not in remote application data store 38. Consequently modified R1 in local application data store 26 is to be replicated in remote application data store 38. New record R2 is to be replicated in remote application data store 38 while new record R3 is to be replicated in local application data store 26. Following synchronization, as illustrated in FIG. 4, local and remote application data stores 26 and 38 contain identical records R1, R2, and R3. Global, local, and remote change data stores 30, 28, and 40 contain identical change counters for each record, R1, R2, and R3.

Figure 5:
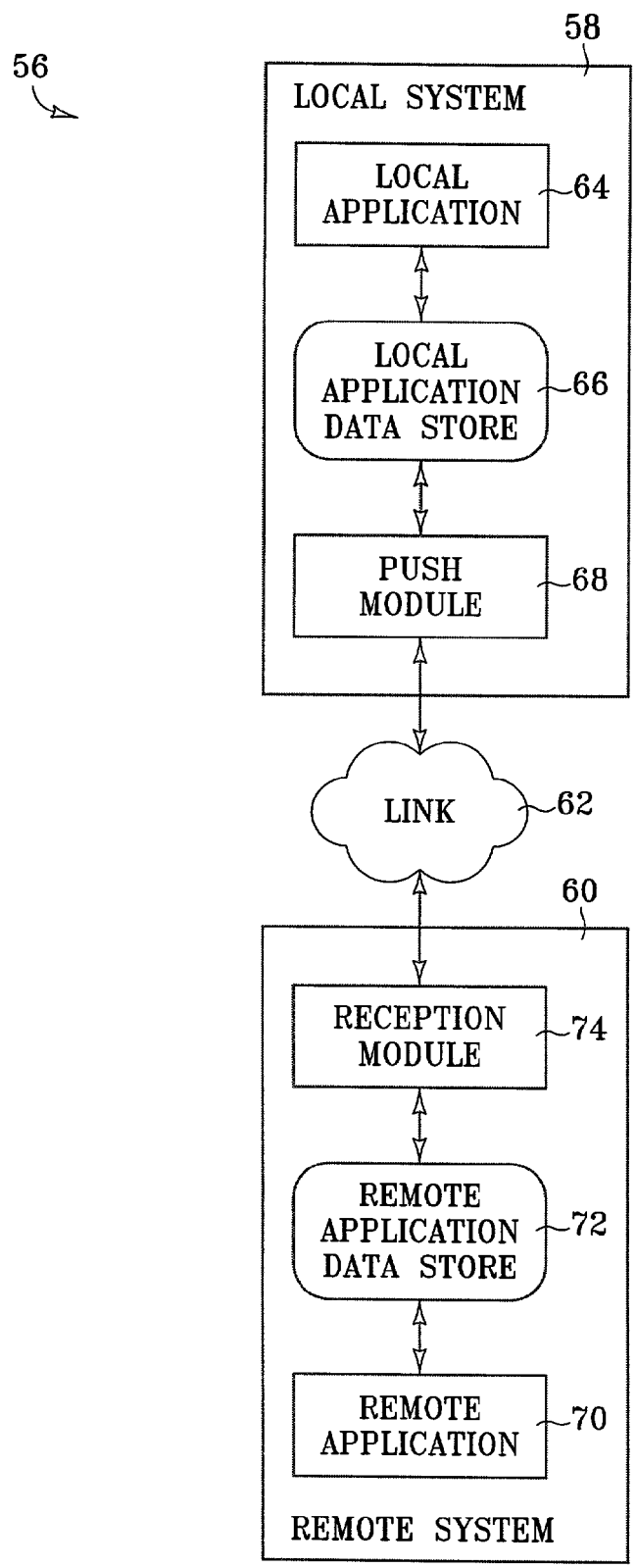
FIG. 5 is a schematic representation of a computing environment employing a push synchronization scheme.

PUSH SYNCHRONIZATION: FIG. 5 illustrates computing environment 56 that employs a push synchronization scheme. Environment 56 includes local system 58 and remote system 60 interconnected by link 62. Systems 58 and 60 can be personal computers, servers, PDA's (Personal Digital Assistants), or any other computing devices or combination of computing devices and peripherals capable of utilizing and sharing records. Typically, local system 58 is a server while remote system 60 is a wireless device such as a pager, cellular telephone, or PDA having a cellular modem. Link 62 represents generally a cable, wireless, or remote connection via a telecommunication link, an infrared link, a radio frequency link, or any other connector or system that provides electronic communication between the devices. Link 62 may represent, in part, an intranet, the Internet, or a combination of both.

Local system 58 includes local application 64, local application data store 66, and push module 68. Local application 64 represents generally any programming capable of utilizing and sharing records. Local application 64 may be or include, among many others, a calendaring program, an electronic mail organizer, a task scheduler, an electronic address book, or any combination of the above. Local application data store 66 represents generally a logical memory area containing the records used by local application 64. The records may include appointments, tasks, electronic mail, addresses, and/or other shared electronic documents or files. Push module 68 represents generally any programming capable of monitoring local application data store 66 for changes and then transferring or pushing records affected by the changes to remote system 60. Relevant changes include the addition of new records, the modification of existing records, or a deletion of records.

Remote system includes remote application 70, remote application data store 72, and reception module 74. Remote application 70 represents generally any programming capable of utilizing and sharing records. Remote application data store 72 represents a logical memory area containing the records used by remote application 70. Except for recent modifications, additions, and/or deletions, these records are replicas of the records stored in local application data store 66. Reception module 74 represents generally any programming capable of receiving from push module 68 records affected by changes to local application data store 66 and using those pushed records to update remote application data store 72.

Figure 6:
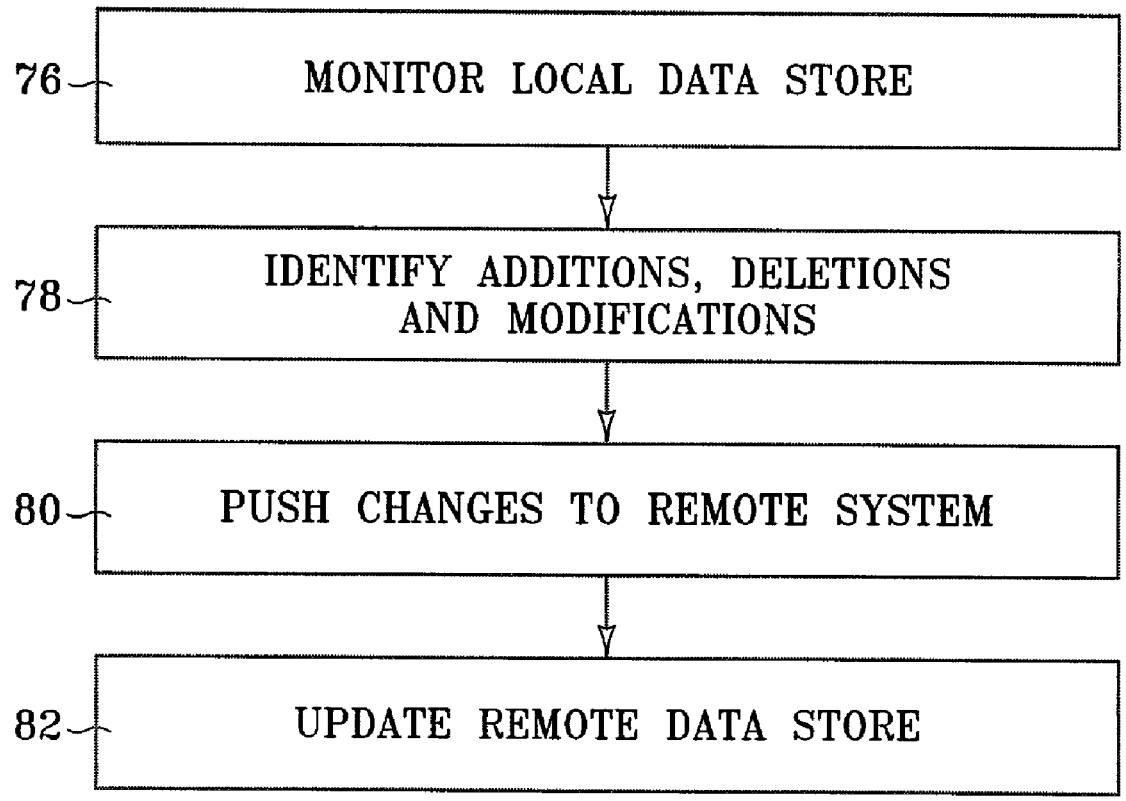
FIG. 6 is a flow diagram illustrating the push synchronization process with respect to FIG. 5.

FIG. 6 is a flow diagram illustrating the push synchronization process utilizing computing environment 56 of FIG. 5. Push module 68 monitors local application data store 66 for changes (step 76). Push module 68 identifies the addition, modification, and/or deletion of a record or records affected by the changes (step 78). Upon detection of a change or changes to local application data store 66, push module 68 retrieves the affected record(s) and pushes those records to remote system 60 (step 80). Reception module 74 receives the record(s) from push module 68 and replicates those record(s) in remote application data store in a format required by remote application 70 (step 82).

Figure 7:
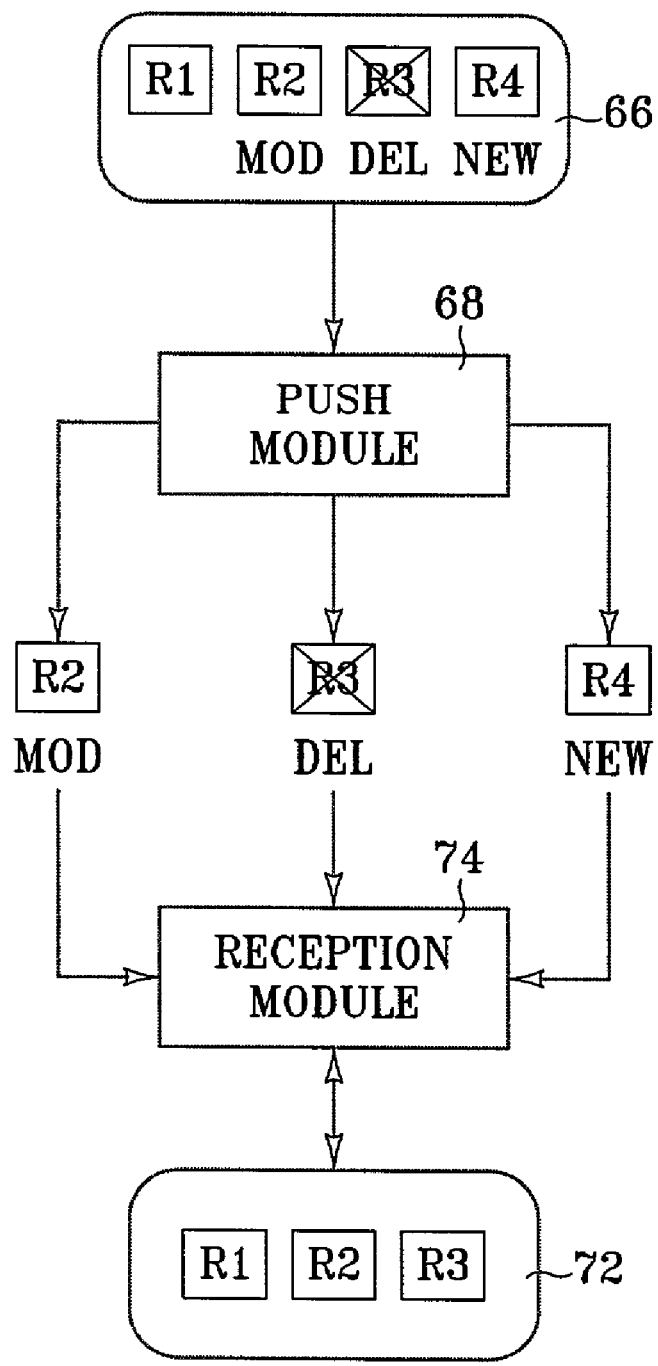
FIGS. 7 and 8 are simplified schematic diagrams of the environment of FIG. 5 providing an example of push synchronization.
Figure 8:
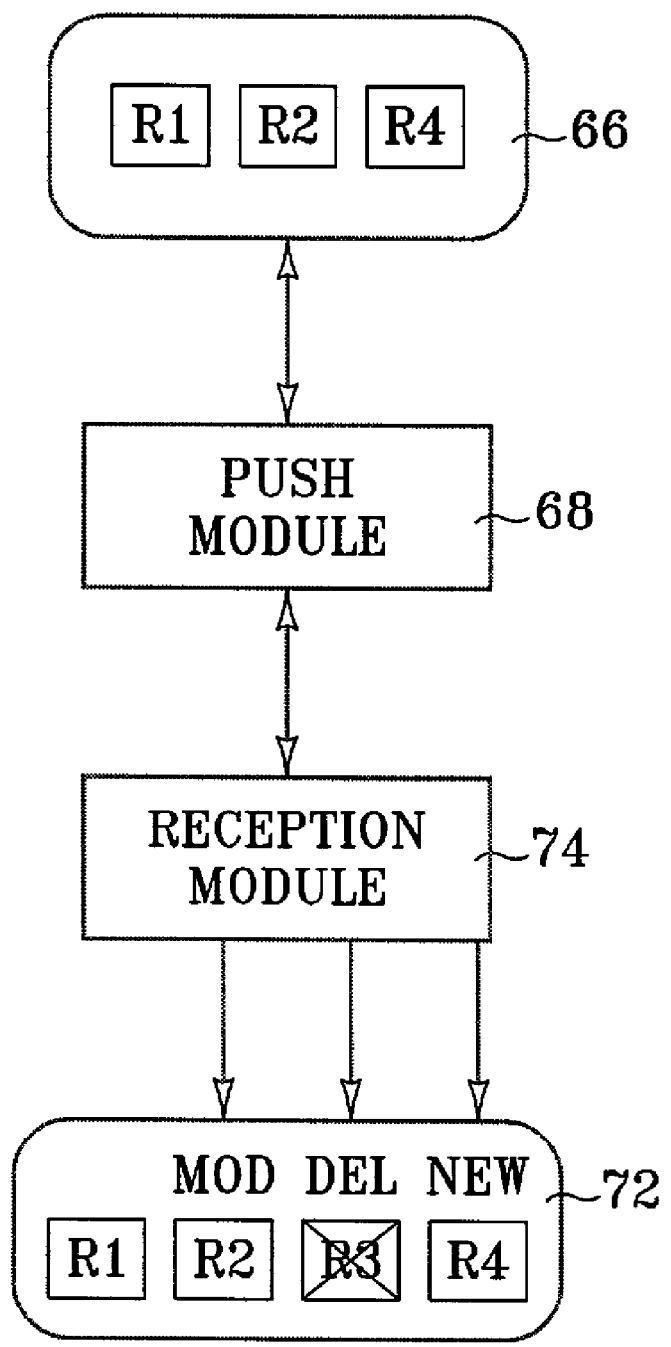

Referring now to FIG. 7 as an example, local application data store 66 contains records R1, R2, and R4. Remote application data store 72 contains records R1, R2, and R3. Monitoring local application data store 66, push module 68 detects that local application 64 has just added R4, modified R2, and deleted record R3. With that information, push module 68 pushes copies of R2 and R4 to reception module 74 with instructions to replicate those records. Push module 68 also sends an instruction to reception module 74 to delete R3. Referring to FIG. 8, reception module 74, accessing remote application data store 72, adds R4, replaces existing R2 with the updated R2 received from push module 68, and deletes R3. As a result, local and remote application data stores 66 and 72 are synchronized, each containing identical records R1, R2, and R4.

Figure 9:
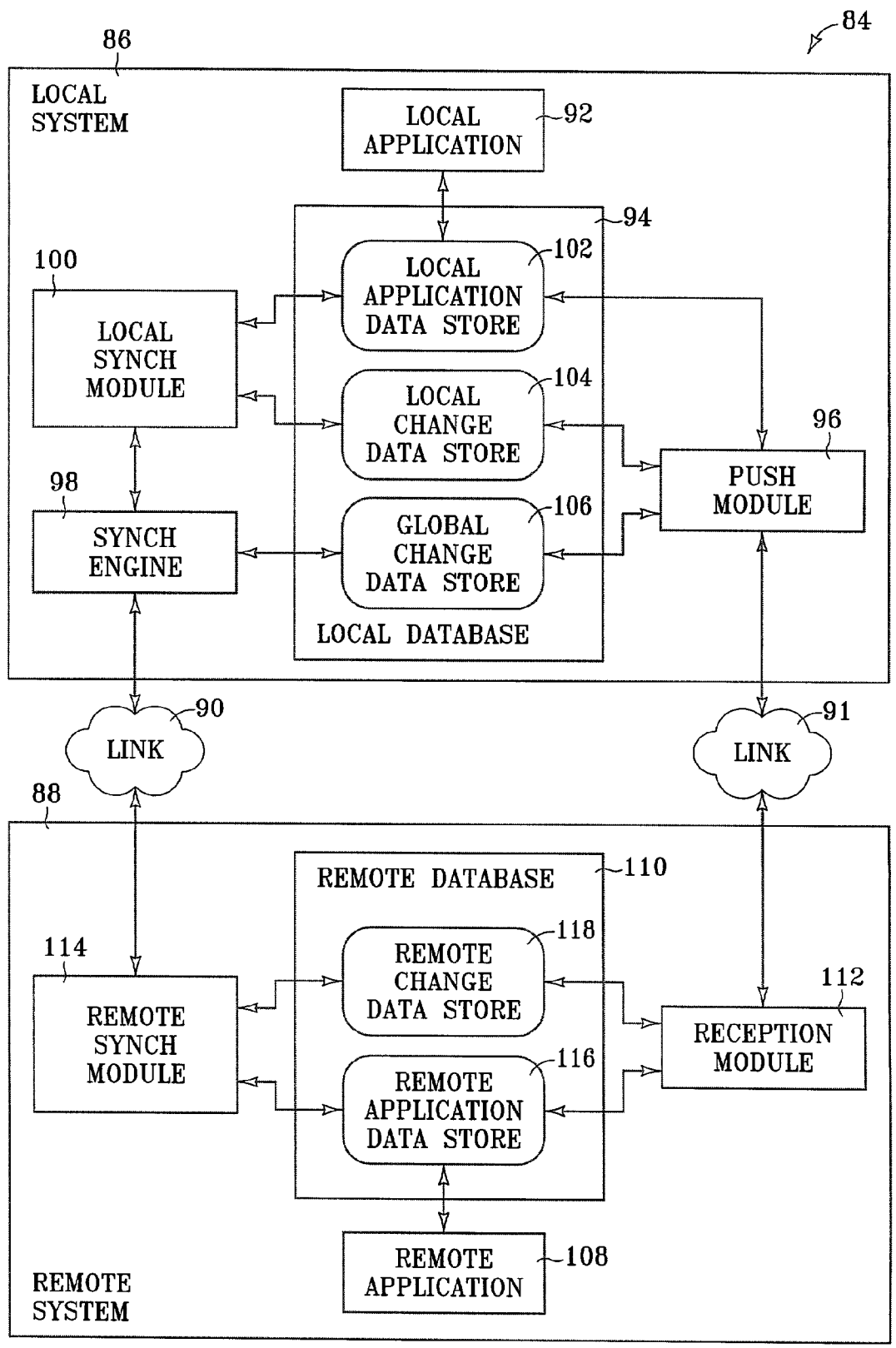
FIG. 9 is a schematic illustration of a computing environment employing a coordinated synchronization scheme according to one embodiment of the present invention.
Figure 10:
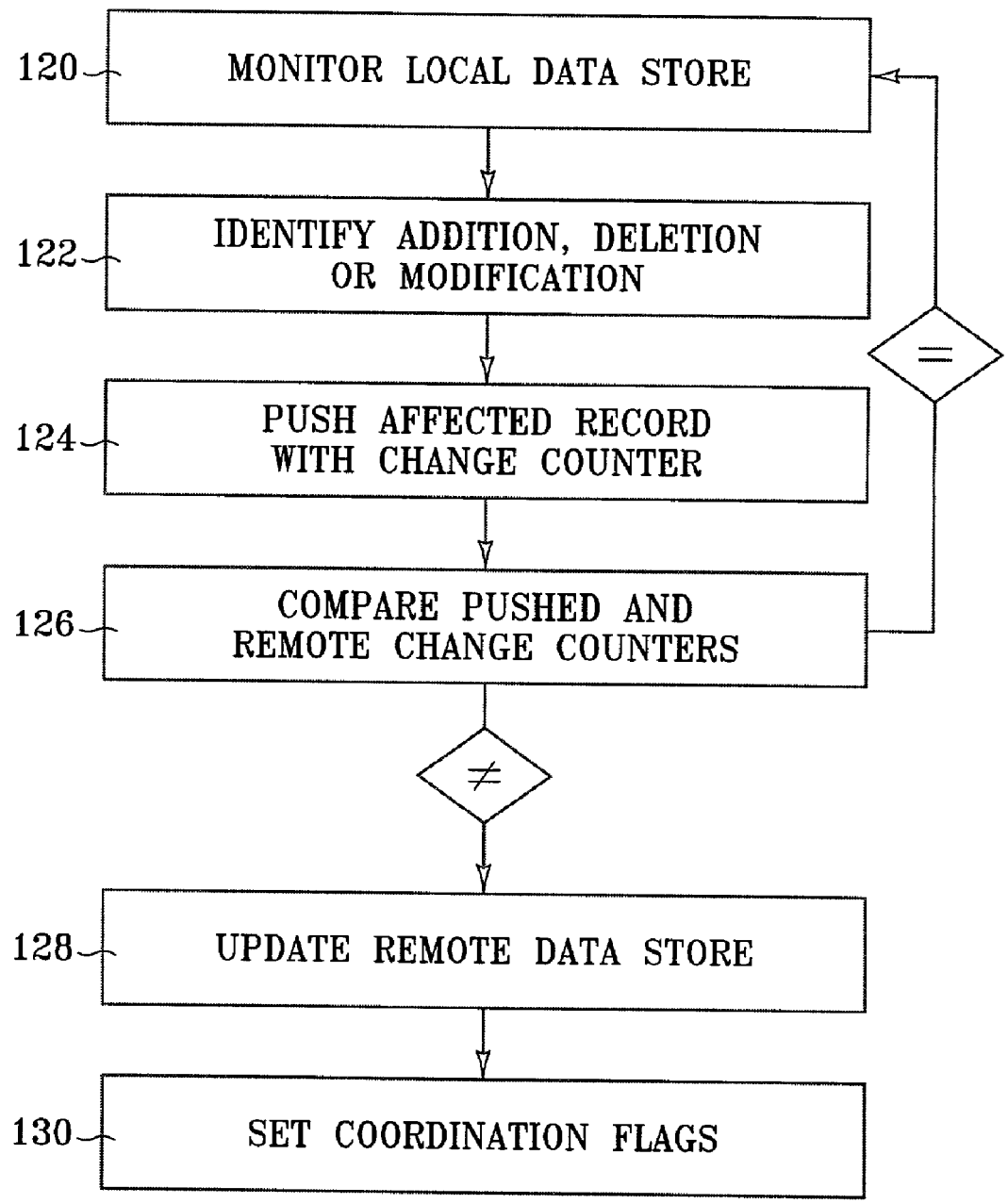
FIG. 10 is a flow diagram illustrating the coordinated push synchronization process with respect to FIG. 9 according to one embodiment of the present invention.
Figure 11:
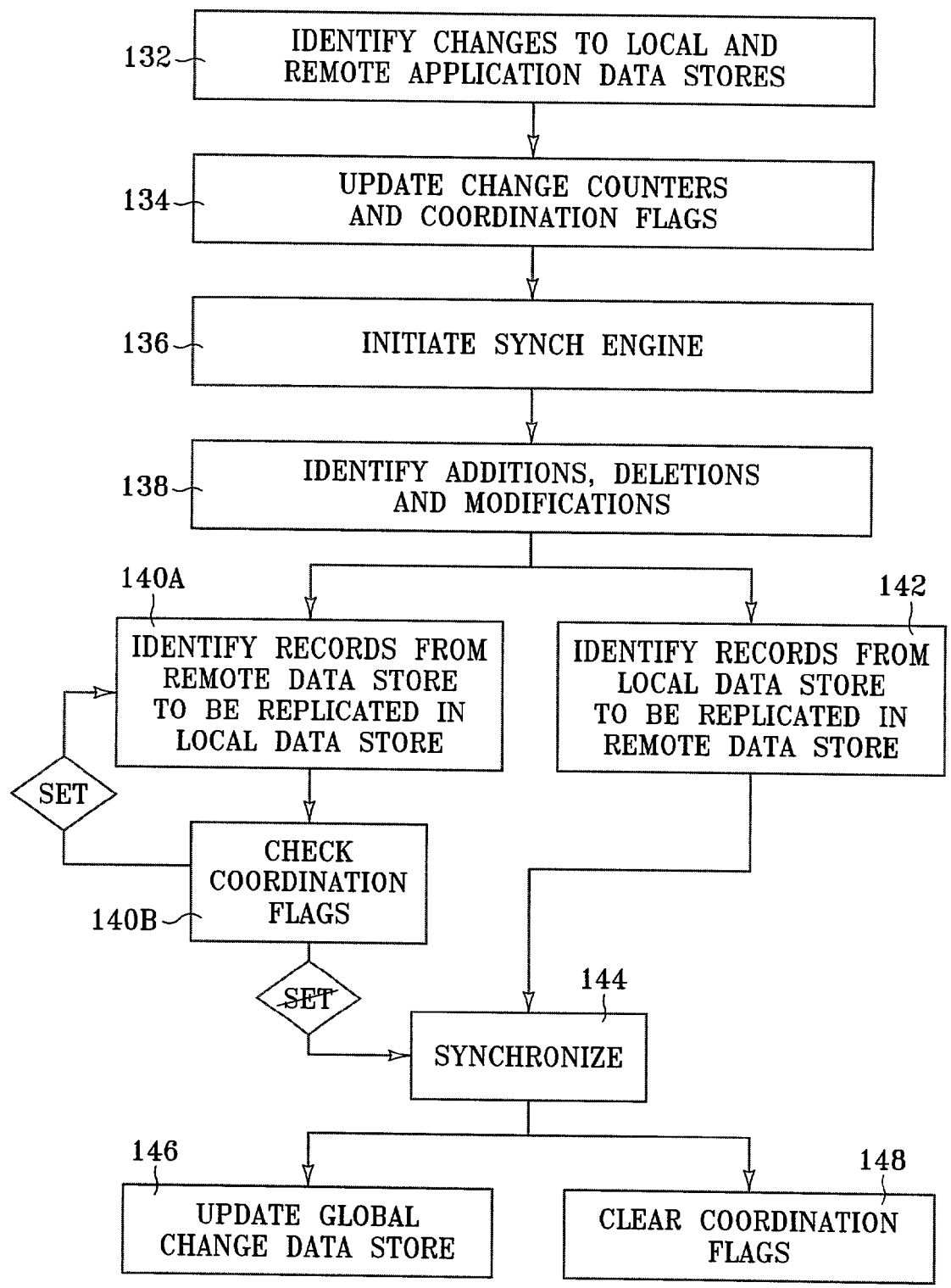
FIG. 11 is a flow diagram illustrating the coordinated user-initiated synchronization process with respect to FIG. 9 according to one embodiment of the present invention.

COORDINATED SYNCHRONIZATION: FIG. 9 illustrates a computing environment 84 that employs a coordinated synchronization scheme. The term coordinated synchronization refers to the environments ability to employ both a user-initiated scheme and a push synchronization scheme. As will be discussed below, the two schemes interact in such a way as to prevent data duplication and/or loss. FIG. 10 is a flow diagram that focuses on push synchronization. FIG. 11 is a flow diagram that focuses on user-initiated synchronization. FIGS. 12-15 provide examples of coordinated synchronization.

Referring to FIG. 9, environment 84 includes local system 86 and remote system 88 interconnected by links 90 and 91. Systems 86 and 88 can be personal computers, servers, PDA's (Personal Digital Assistants), or any other computing devices or combination of computing devices and peripherals capable of utilizing and sharing records. Links 90 and 91 represents generally a cable, wireless, or remote connection via a telecommunication link, an infrared link, a radio frequency link, or any other connector or system that provides electronic communication between the devices. Links 90 and 91 may represent, in part, an intranet, the Internet, or a combination of both.

Local system 86 includes local application 92, local database 94, push module 96, synch engine 98, and local synch module 100. Local application 92 represents generally any programming capable of utilizing and sharing records. Application 92 may be or include, among many others, a calendaring program, an electronic mail organizer, a task scheduler, an electronic address book, or any combination of the above. Local database 94 represents generally any source of memory capable of storing records and other data accessible by local application 92, push module 96, synch engine 98, and local synch module 100. The records may represent, among many other items, appointments, tasks, electronic mail, addresses, and/or other shared electronic documents or files. Push module 96 represents generally any programming capable of monitoring local database 94 for changes relating to the records it contains and then transferring or pushing replicas of the records affected by those changes or instructions to delete records affected by those changes to remote system 88. Relevant changes include the addition of a new record, the modification of an existing record, or a deletion of a record.

Synch engine 98 represents any programming capable of synchronizing records stored on local system 86 with records stored on remote system 88. Local synch module 100 represents any programming capable of, at the request of synch engine 22, retrieving records from local database 94, updating records in local database 94 in the format required by local application 92, and tracking changes made to local database by local application 92. Again, relevant changes include the addition of a new record, the modification of an existing record, or a deletion of a record Local database 94 includes local application data store 102, local change data store 104, and global change data store 106. Local application data store 102 represents a logical memory area containing the records used by local application 92. These records may represent appointments, tasks, electronic mail, addresses, and/or other shared electronic documents or files. Local change data store 104 represents a logical memory area containing electronic data representing any changes made to local application data store 106 detected by local synch module 100 as well as activities of push module 96. Global change data store 106 represents a logical memory area containing electronic data representing changes detected by synch engine 98.

It is expected that local and global change data stores 104 and 106 will contain change counters. Each change counter will be associated with a record in local application data store 102 and will have a value. The change counter's value will represent the number of times the particular record has been altered. For example, a value of "one" indicates that the record has been created. Each increase in value indicates that a change has been made to the record. An increase to the value can be made through a logical alphanumeric progression (1, 2, 3, etc. or A, B, C, etc.) or it may be made through any arbitrary selection of numbers, characters, or any other recognizable symbols. The change counters in local change data store 104 are each associated with coordination flag. The coordination flag can be "set" or "reset." A flag is set, for example, when its value is changed to "one." A flag is reset, for example, when its value is changed to "zero." The specific values of "zero" and "one" are not important. A set flag could be represented by the letter "A" and a reset flag could be represented by the number "twelve." The choice is arbitrary.

Remote system 88 includes remote application 108, remote database 110, reception module 112, and remote synch module 114. Remote application 108 represents generally any programming capable of utilizing and sharing records. Remote database 110 represents any source of memory capable of storing records and other data accessible by remote application 32, reception module 112, and remote synch module 114. Reception module 112 represents generally any programming capable of receiving records from push module 96 and using those records to update remote application data store 116.

Remote synch module 114 represents any programming capable of, at the request of synch engine 98, retrieving records from remote database 110, updating records in remote database 110 in the format required by remote application 108, and tracking changes made to the records in remote database 110 by remote application 108. Remote database 110 includes remote application data store 116 and remote change data store 118. Remote application data store 116 represents a logical memory area containing the records used by remote application 108. Except for recent modifications, additions, and/or deletions, these records are replicas of the records stored in local application data store 104. Remote change data store 118 represents a logical memory area containing electronic data representing changes made in remote application data store 116 by remote application 108. Like local change data store 104, it is expected that remote change data store 118 will contain change counters and coordination flags associated with each record in remote application data store 116.

The flow diagram of FIG. 10 illustrates actions taken by the components of environment 84 of FIG. 9 during a coordinated push synchronization. Push module 96 monitors local application data store 102 for a change (step 120). Relevant changes include the addition, modification, and/or deletion of a record or records. Push module 68 identifies the addition, modification, or deletion of a record affected by a change (step 122), pushing the affected record along with its change counter from local change data store 104 to remote system 88 (step 124). Pushing a record involves, in the case of a new or modified record, transferring a replica of the record to remote system 88. In the case of a deleted record, pushing the record involves sending instructions to delete the record on remote system 88. Reception module 112 then compares the change counter for that record in remote change data store 118 with the change counter for that record provided in step 124 (step 126). If the change counters are equal, that record is ignored, and the process repeats with step 120. If the change counters are not equal, then reception module 112, using the pushed record, updates remote application data store 116 (step 128). To indicate that the pushed record has been used to update remote application data store 116, push and reception modules 96 and 112 set the coordination flags associated with the change counter for that record in local and remote change data stores 104 and 118 (step 130).

The flow diagram of FIG. 11 illustrates actions taken by the components of environment 84 of FIG. 9 during coordinated user-initiated synchronization. Application specific sync modules 100 and 114 monitor and identify changes made to local and remote application data stores 102 and 116 (step 132). To do so, local and remote synch modules 100 and 114 associate each record, upon creation, in respective local and remote application data stores 102 and 116 with a change counter stored in local or remote change data stores 104 or 118 (step 134). The change counters in local and remote change data stores 104 and 118 are each associated with a coordination flag. As noted above, the change counters reflect the number of times a record has been altered. The coordination flags indicate whether a particular record, in its current form, has been used by reception module 112 to update remote application data store 116. When local synch module 100 detects that a record in local application data store 102 has been altered, it increases the value of the change count associated with that record in local change data store 104. The same is true for remote synch module 114 with respect to remote application data store 116 and remote change data store 118.

A user then initiates synch engine 98 (step 136). Synch engine 98 identifies additions, deletions, and modifications to local and remote application data stores 102 and 116 (step 138). Synch engine 98 obtains the change counters found in local and remote change data stores 104 and 118. Global change data store 106 also contains change counters, each change counter associated with a record. The change counters in global change data store 106 reflect the status of the records following the most recent synchronization. To determine if a particular record has been changed, synch engine 98 compares the record's change counter found in global change data store 106 with the record's change counters found in local and remote change data stores 104 and 118. If the change counters are equal, then no modifications have been made to the record since the last synchronization. If the change counter in either local or remote change data stores 104 or 118 exceeds the change counter found in global change data store 106 for the particular record, then the record has been modified since the last user-initiated synchronization. If global change data store 106 does not contain a change counter for a record found in local or remote application data store 102 or 116, then that record is new. If global change data store 30 contains a change counter for a record not found in local or remote application data stores 102 and/or 116, then that record has been deleted from one or both data stores 102 and/or 106.

Synch engine 98 next determines which records from local application data store 102 are to be replicated in remote application data store 116 (step 140A) and which records from remote application data store 116 are to be replicated in local application data store 102 (step 142). When determining, in step 140A, if a particular record in local application data store 102 is to be replicated, local and remote synch modules 100 and 114 examine the coordination flags for that record in local and remote change data stores 104 and 118 (step 140B). If the flag is set in either store, then that record is ignored. The set flag indicates that the record has already been pushed to remote application data store 116. With the data acquired and analyzed in the previous steps, synch engine 98 synchronizes local application data store 102 with remote application data store 116 (step 144). Once complete, synch engine 98 updates global change data store 106 to reflect the change counts found in local and remote change stores 104 and 118 (step 146). Global, local, and remote change data stores 30, 104 and 118 should now contain identical change counters for each record indicating to synch engine 98 that local and global application data stores 102 and 116 are synchronized. Local and remote synch modules 100 and 114 reset coordination flags in local and remote change data stores 104 and 118 (step 148).

Figure 12:
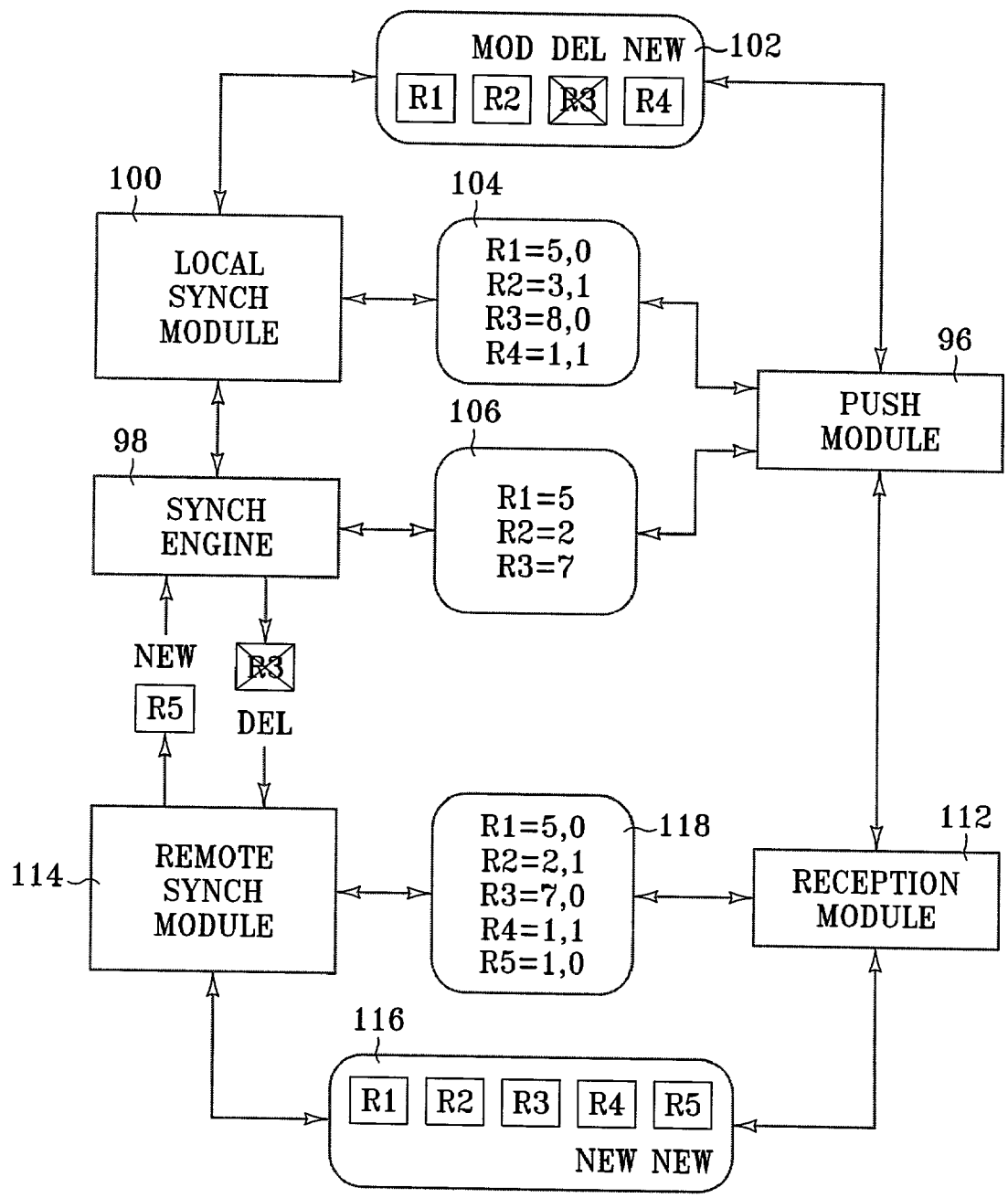
FIGS. 12 and 13 are simplified schematic diagrams of the environment of FIG. 9 providing examples of coordinated user-initiated synchronization.
Figure 13:
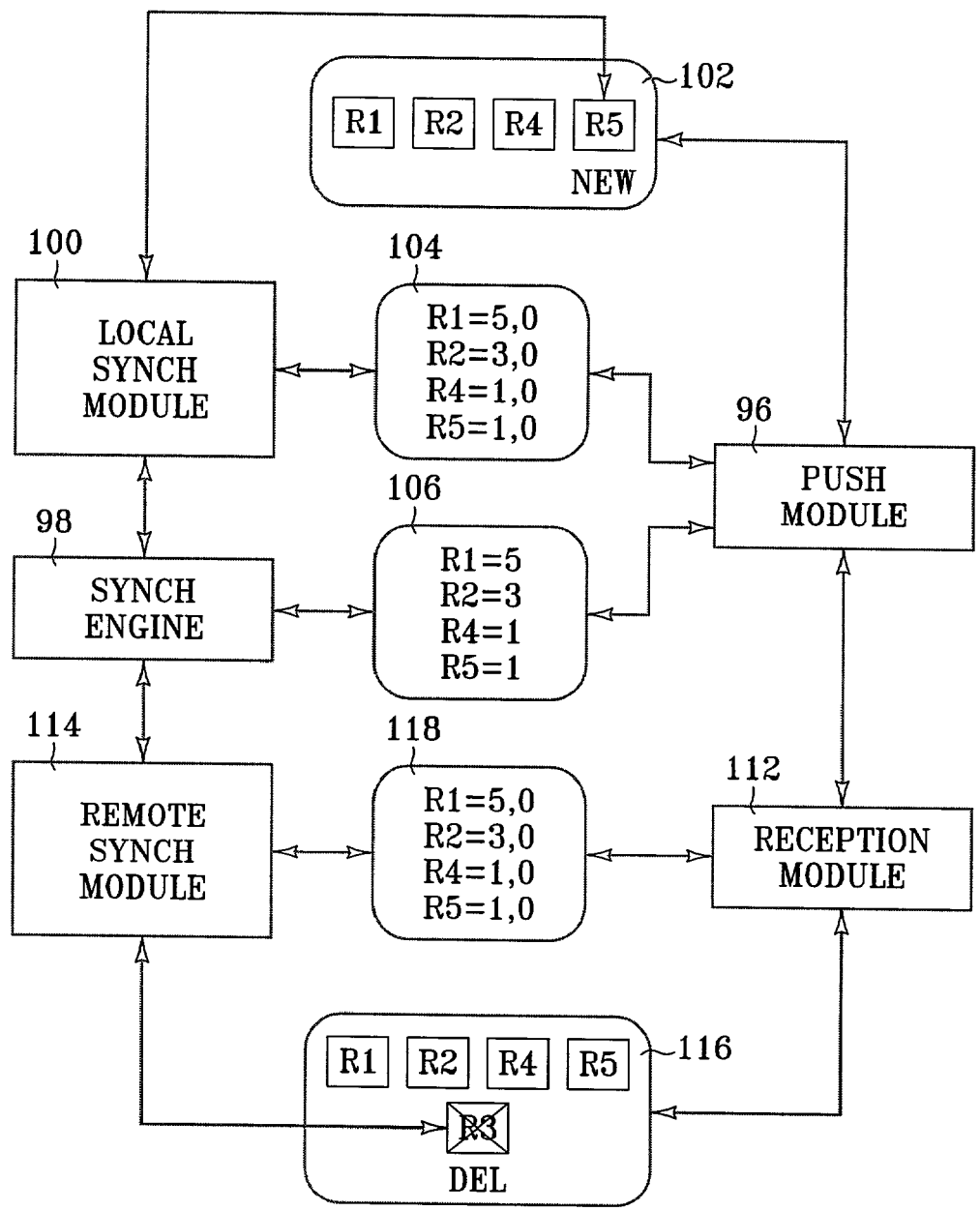

FIGS. 12 and 13 provide an example of coordinated user-initiated synchronization. Referring first to FIG. 12, local application data store 102 includes three records R1, R2, and R4. R3 has been deleted. Local change data store 104 indicates that R1 has a change counter/flag of "5,0." The number five indicates that the record has been created and then modified four times. The zero represents that the coordination flag is reset, meaning that the record has not used by reception module 112, in its current form, to update remote application data store 116. R2 has a change counter/flag of "3,1"—it has been altered twice since created and, in its current form, it has been used by reception module 112 to update remote application data store 116. R3 has a change counter of "8,0"—it has been altered seven times since created and has not been used by reception module 112 in its current, albeit deleted, form. R4 has a change counter/flag of "1,1"—it has not been altered since created and has been used by reception module 112 in its current form. Remote application data store 116 includes five records R1, R2, R3, R4, and R5. Remote change data store 40 indicates that R1 has been modified four times since created; R2 has been modified once since created and has been updated by reception module 112 in its current form; R4 is new and has been updated by reception module 112 in its current form; R3 has been modified six times; and R5 is new. Global change data store 106 includes change counters for R1, R2, and R3.

A comparison of the change counters in global change data store 106 with those found in local and remote change data stores 104 and 118 indicates that record R1 has not been altered in local or remote application data stores 102 or 116. R2, in local application data store 102, has been modified. R3 has been deleted in local application data store 102 but not in remote application data store 116. R4 is new in local application data store 102 while R5 is new in remote application data store 116. A further analysis of local change data store 104 reveals that coordination flags have been set for R2 and R4. In other words, the modified R2 and the new R4 have already been updated in remote application data store 116. Consequently, to synchronize local and remote application data stores 102 and 116, R3 needs to be deleted from remote application data store 116, and R5 needs to be replicated in local application data store 102. R2 and R4 are to be ignored.

Following synchronization, as illustrated in FIG. 13, local and remote application data stores 102 and 116 contain identical records R1, R2, R4, and R5. Global, local, and remote change data stores 106, 104, and 118 have been updated and contain identical change counters for each record, R1, R2, and R3. Coordination flags have been reset to "zero" in local and remote change data stores 104 and 118. Consequently, if push module 96, monitoring local application data store 102, pushes R5 and its associated change counter from local change data store 104, reception module 112 will first compare the pushed change counter with the change counter for R5 in remote change data store 118. The comparison will reveal that the values for the change counters are identical, and reception module 112 will then ignore the record.

Figure 14:
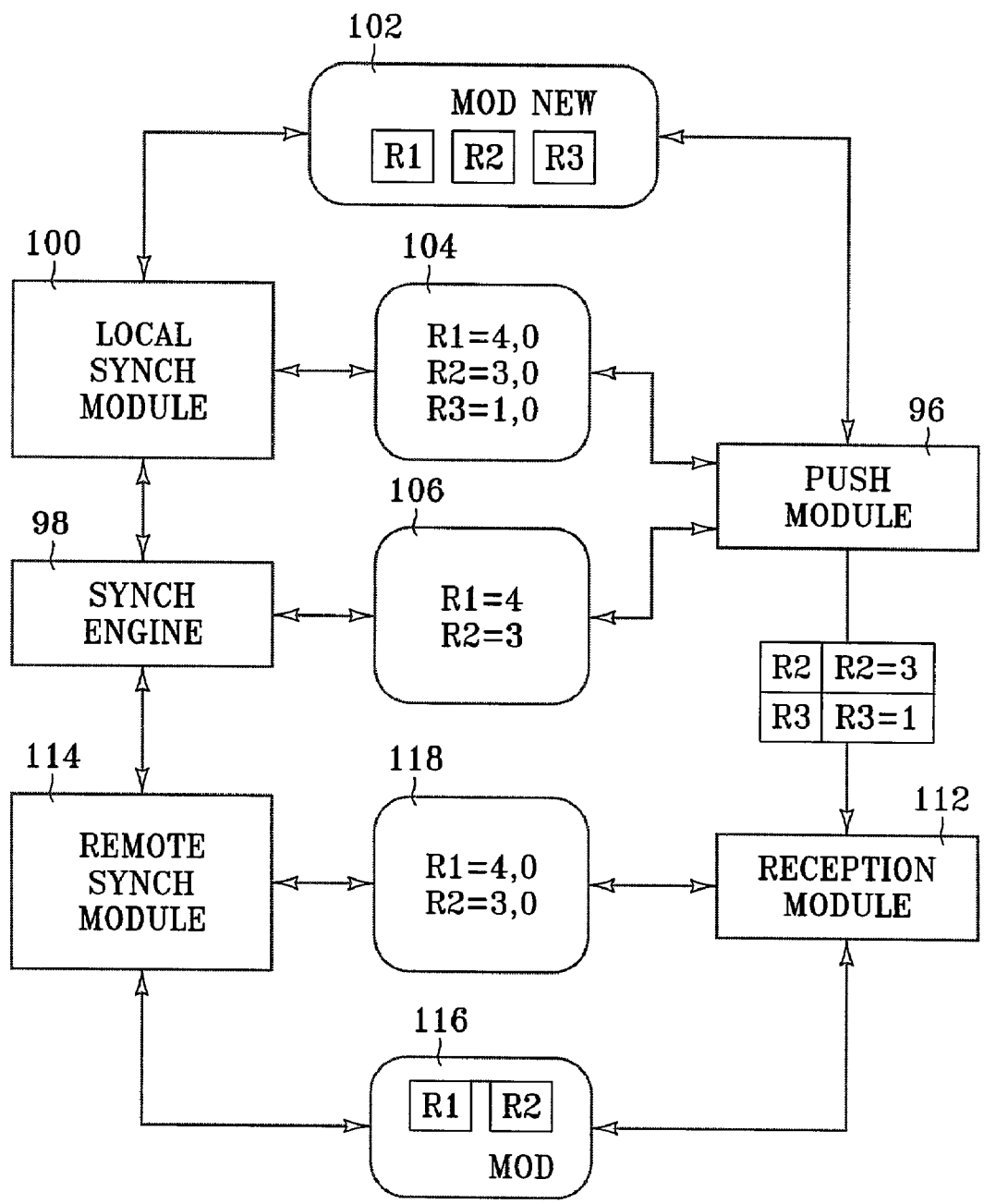
FIGS. 14 and 15 are simplified schematic diagrams of the environment of FIG. 9 providing examples of coordinated push synchronization.
Figure 15:
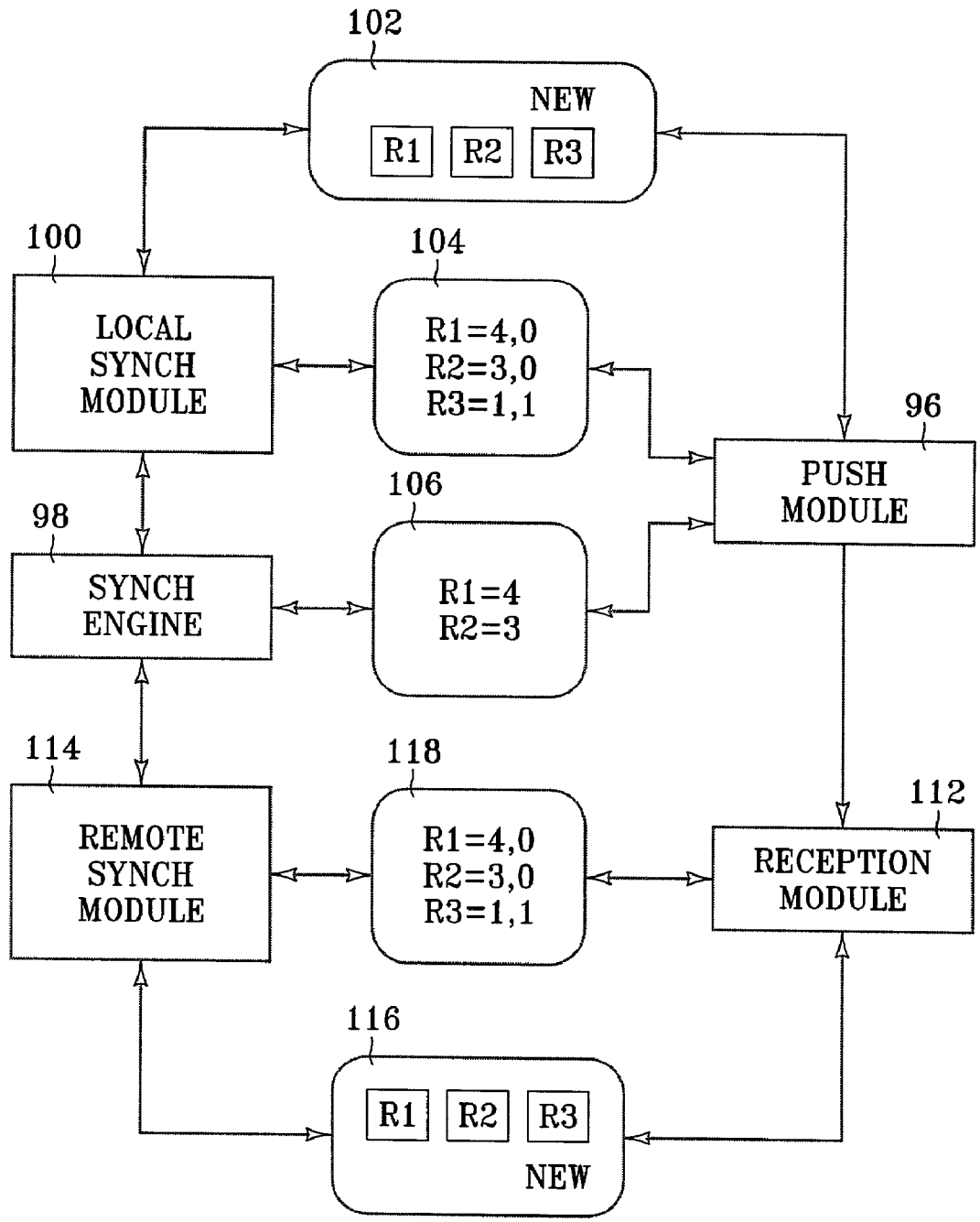

FIGS. 14 and 15 provide an example of coordinated push synchronization. Referring first to FIG. 14, local application data store 102 includes three records R1, R2, and R3. Remote application data store 116 contains records R1 and R2. To push module 96, R2 appears to have been recently modified and R3 appears to be new in local application data store 102. An inspection of local change data store 104 reveals the existence change counters for R1, R2, and R3 and that no coordination flags have been set. A comparison of local change data store 104 with global change data store reveals that R1 has not been modified and that while R2 appears—to push module 96—to have been recently modified, synch engine 98 has already replicated modified R2 in remote application data store 116. As R3 does not have a change counter in global change data store 106, it has not been replicated in remote application data store 116.

After push module 96 pushes modified R2 and new R3 along with the change counter for each from local change data store 104, reception module 112, for each record, compares its change counter in remote change data store 118 with the pushed change counter. If the values of each counter are equal, as is the case with R2 in this example, the record is ignored. Where the values are disparate or non-existent, as is the case with R3, the record is pushed. Consequently, while R2 appears to have been modified, it will be ignored. Reception module 112 will only replicate pushed R3 in remote application data store 116. Push and reception modules 96 and 112 then set the coordination flags for R3 in local and remote change data stores 104 and 118.

Referring to FIG. 15, local and remote application data stores 102 and 116 contain identical records R1, R2, and R3 following the push of R3. Local and remote change data stores 104 and 118 contain change counters for R1, R2, and R3. Only R3 has a coordination flag set indicating that R3 used by reception module 112 in its current form to update remote application data store 116. Global change data stores 106 remains unchanged. Consequently, if synch engine 98 were initiated, it would determine that R3 was new after finding R3's change counter in local change data store 104 but not in global change data store 106. Because the coordination flag is set, however, synch engine 98 would not replicate R3 in remote application data store 116. Instead synch engine 98 would store a change counter for R3 in global change data store 106 and instructs local and remote synch modules 100 and 114 to reset the coordination flags for R3 in local and remote change data stores 104 and 118.

The block diagrams of FIGS. 9 and 12-15 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain the programming of the present invention for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

The descriptive terms "local" and "remote" used through out the previous description are intended only to distinguish the items they describe and do not relate necessarily to proximity. For example, a local system may be a system that a user is accessing at a given time. A remote system in one instance may be a local system in another.

Although the flowcharts of FIGS. 10 and 11 show a specific order of execution, the order of execution may differ from that which is depicted. For example, the order of execution of two or more blocks may be scrambled relative to the order shown. Also, two or more blocks shown in succession in FIGS. 10 and 11 may be executed concurrently or with partial concurrence. All such variations are within the scope of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A coordinated push synchronization method, comprising the acts of:
    detecting changes to a local application data store;
    identifying a record affected by a detected change;
    pushing the identified record to a remote application data store;
    ascertaining whether the pushed record, in its current form as affected by the detected change, has already been replicated or deleted in the remote application data store in order to determine whether the remote application data store will be updated with the pushed record;
    if not, updating the remote application data store with the pushed record and identifying the pushed record in the remote application data store as having been pushed from the local application data store to the remote application data store, otherwise ignoring the pushed record;
    wherein the act of pushing the identified record comprises:
    if the identified record has been detected as being new, pushing a replica of the identified record with instructions to save the replica in the remote application data store;
    if the identified record has been detected as being modified, pushing a replica of the identified record with instructions to save the replica in the remote application data store replacing a prior version of the record; and
    if the identified record has been detected as being deleted, pushing instructions to delete a prior version of the identified record contained in the remote application data store.

2. The method of claim 1, wherein the act of ascertaining includes comparing a local change counter associated with the pushed record in the local application data store with a remote change counter associated with a corresponding record in the remote application data store.

3. The method of claim 1, wherein the act of identifying the pushed record in the remote application data store as a pushed record comprises associating an indicator with the pushed record identifying the pushed record in the remote application data store as a pushed record.

4. The method of claim 3, wherein the act of associating comprises setting a coordination flag for the pushed record.

5. A coordinated user-initiated synchronization method, comprising the acts of:
    detecting changes to a local application data store;
    identifying a record affected by a detected change;
    ascertaining whether the identified record, in its current form as affected by the detected change, was pushed to the local application data store from a remote application data store; and
    if not, synchronizing the remote application data store with the local application data store;
    wherein the act of synchronizing comprises:
    if the identified record has been detected as being new, replicating the identified record in the remote application data store;
    if the identified record has been detected as being modified, replicating the identified record in the remote application data store replacing a prior version of the record; and
    if the identified record has been detected as being deleted, deleting the version of the identified record from the remote application data store.

6. The method of claim 5, wherein the act of ascertaining includes examining an indicator associated with a pushed record identifying the pushed record in the remote application data store as a pushed record.

7. The method of claim 6, wherein the indicator comprises a coordination flag, a set coordination flag indicating that a record is a pushed record and a reset coordination flag indicating that the record is not a pushed record.

8. A coordinated push and user-initiated synchronization method, comprising:
    detecting changes to a local application data store;
    identifying a first record in the local application data store affected by a detected change;
    pushing the first record to a remote application data store;
    ascertaining whether the pushed record, in its current form as affected by the detected change, has already been replicated in or deleted from the remote application data store and, if not, updating the remote application data store with the pushed record;
    detecting changes to the remote application data store;
    identifying a second record in the remote application data store affected by a detected change;
    ascertaining whether the second record, in its current form as affected by the detected change, has already been pushed into the remote application data store in order to determine whether the remote application data store will be updated with the pushed record and, if not, synchronizing the remote application data store with the local application data store, otherwise ignoring the pushed record;
    wherein the act of pushing the first record comprises:
    if the first record has been detected as being new, pushing a replica of the first record with instructions to save the replica in the remote application data store;
    if the first record has been detected as being modified, pushing a replica of the first record with instructions to save the replica in the remote application data store replacing a prior version of the record; and if the first record has been detected as being deleted, pushing instructions to delete a prior version of the first record contained in the remote application data store.

9. The method of claim 8, wherein the act of ascertaining whether the pushed record has been replicated in or deleted from the remote application data store includes comparing a local change counter associated with the pushed record in the local application data store with a remote change counter associated with a corresponding record in the remote application data store.

10. The method of claim 8, wherein the act of ascertaining whether the pushed record has been replicated in or deleted from the remote application data store includes examining an indicator associated with the pushed record identifying the pushed record in the remote application data store as a pushed record.

11. The method of claim 8, further comprising, after updating the remote application data store with the pushed record, identifying the pushed record in the remote application data store as having been pushed from the local application data store to the remote application data store.

12. A coordinated push synchronization computer program product comprising a computer useable medium having computer readable instructions thereon for:

detecting changes to a local application data store;

identifying a record affected by a detected change;

pushing the identified record to a remote application data store;

ascertaining whether the pushed record, in its current form as affected by the detected change, has already been replicated or deleted in the remote application data store in order to determine whether the remote application data store will be updated with the pushed record;

if not, updating the remote application data store with the pushed record and identifying the pushed record in the remote application data store as having been pushed from the local application data store to the remote application data store, otherwise ignoring the pushed record;

wherein the instructions for pushing the identified record comprise instructions for:

if the identified record has been detected as being new, pushing a replica of the identified record with instructions to save the replica in the remote application data store;

if the identified record has been detected as being modified, pushing a replica of the identified record with instructions to save the replica in the remote application data store replacing a prior version of the record; and if the identified record has been detected as being deleted, pushing instructions to delete a prior version of the identified contained in the remote application data store.

13. The product of claim 12, wherein the instructions for ascertaining include instructions for comparing a local change counter associated with the pushed record in the local application data store with a remote change counter associated with a corresponding record in the remote application data store.

14. The product of claim 12, wherein the instructions for identifying the pushed record in the remote application data store as a pushed record comprise instructions for associating an Indicator with the pushed record identifying the pushed record in the remote application data store as a pushed record.

15. A coordinated user-initiated synchronization computer program product comprising a computer useable medium having computer readable instructions thereon for:

detecting changes to a local application data store;

identifying a record affected by a detected change;

ascertaining whether the identified record, in its current form as affected by the detected change, was pushed to the local application data store from a remote application data store; and if not, synchronizing the remote application data store with the local application data store;

wherein the instructions for synchronizing comprise instructions for:

if the identified record has been detected as being new, replicating the identified record in the remote application data store;

if the identified record has been detected as being modified, replicating the identified record in the remote application data store replacing a prior version of the record; and if the identified record has been detected as being deleted, deleting the version of the identified record from the remote application data store.

16. The product of claim 15, wherein the instructions for ascertaining include instructions for examining an indicator associated with a pushed record identifying the pushed record in the remote application data store as a pushed record.

17. A coordinated push and user-initiated synchronization computer program product comprising a computer useable medium having computer readable instructions thereon for:

detecting changes to a local application data store;

identifying a first record in the local application data store affected by a detected change;

pushing the first record to a remote application data store;

ascertaining whether the pushed record, in its current form as affected by the detected change, has already been replicated in or deleted the remote application data store and, if not, updating the remote application data store with the pushed record;

detecting changes to the remote application data store;

identifying a second record in the remote application data store affected by a detected change;

ascertaining whether the second record, in its current form as affected by the detected change, has already been pushed into the remote application data store in order to determine whether the remote application data store will be updated with the pushed record and, if not, synchronizing the remote application data store with the local application data store, otherwise ignoring the pushed record;

wherein the instructions for pushing the first record comprise instructions for:

if the first record has been detected as being new, pushing a replica of the first record with instructions to save the replica in the remote application data store;

if the first record has been detected as being modified, pushing a replica of the first record with instructions to save the replica in the remote application data store replacing a prior version of the record; and if the first record has been detected as being deleted, pushing instructions to delete a prior version of the first record contained in the remote application data store.

18. The product of claim 17, wherein the instructions for ascertaining whether the pushed record has been replicated in or deleted from the remote application data store include instructions for comparing a local change counter associated with the pushed record in the local application data store with a remote change counter associated with a corresponding record in the remote application data store.

19. The product of claim 17, wherein the instructions for ascertaining whether the pushed record has been replicated in or deleted from the remote application data store include instructions for examining an indicator associated with the pushed record identifying the pushed record in the remote application data store as a pushed record.

20. The product of claim 17, further comprising instructions for, after updating the remote application data store with the pushed record, identifying the pushed record in the remote application data store as having been pushed from the local application data store to the remote application data store.

* * * * *